United States Patent
Earith et al.

(10) Patent No.: US 7,658,077 B2
(45) Date of Patent: Feb. 9, 2010

(54) SYSTEM FOR DEICING AN AIRCRAFT TURBINE ENGINE INLET CONE

(75) Inventors: Thomas Julien Roland Earith, Veneux les Sablons (FR); Jean-Yves Picart, Dammarie-les-Lys (FR)

(73) Assignee: SNECMA, Paris (FR)

( * ) Notice: Subject to any disclaimer, the term of this patent is extended or adjusted under 35 U.S.C. 154(b) by 328 days.

(21) Appl. No.: 11/689,312

(22) Filed: Mar. 21, 2007

(65) Prior Publication Data

US 2007/0220899 A1 Sep. 27, 2007

(30) Foreign Application Priority Data

Mar. 22, 2006 (FR) .................................. 06 02492

(51) Int. Cl.
*F02C 7/047* (2006.01)
*F02C 7/06* (2006.01)
*F02C 7/00* (2006.01)

(52) U.S. Cl. ..................... 60/779; 60/39.08; 60/39.093; 60/785

(58) Field of Classification Search ................ 60/39.08, 60/39.093, 39.83, 786, 779, 782, 785; 244/134 R; 184/6.11

See application file for complete search history.

(56) References Cited

U.S. PATENT DOCUMENTS

| 3,528,241 | A | * | 9/1970 | Venable et al. | ............. | 60/39.08 |
| 3,925,979 | A | * | 12/1975 | Ziegler | ........................ | 60/785 |
| 4,546,604 | A | * | 10/1985 | Moore et al. | ............. | 60/39.093 |
| 4,863,354 | A | * | 9/1989 | Asselin et al. | .......... | 416/245 R |
| 4,941,317 | A | * | 7/1990 | Ivey et al. | ................ | 60/39.093 |

FOREIGN PATENT DOCUMENTS

| FR | 1 090 733 | 4/1955 |
| FR | 1 119 844 | 6/1956 |
| FR | 2 621 554 | 4/1989 |

* cited by examiner

*Primary Examiner*—Ted Kim
(74) *Attorney, Agent, or Firm*—Oblon, Spivak, McClelland, Maier & Neustadt, L.L.P.

(57) ABSTRACT

The invention relates to a system (2) for deicing an aircraft turbine engine inlet cone (4) comprising air-diffusing means (18) intended to equip the inlet cone of the turbine engine so as to deliver hot air thereto. According to the invention, it also comprises a circuit (20) for removing pressurizing air from at least one bearing enclosure of the turbine engine, this circuit communicating with the air-diffusing means in order to be able to supply the latter with hot air.

13 Claims, 3 Drawing Sheets

SYSTEM FOR DEICING AN AIRCRAFT TURBINE ENGINE INLET CONE

TECHNICAL FIELD

The present invention relates in general to a system for deicing an inlet cone of an aircraft turbine engine such as a turbojet or a turboprop engine.

The invention also relates to a turbine engine equipped with such an inlet cone deicing system and to a method of deicing an aircraft turbine engine inlet cone.

PRIOR ART

The prior art discloses a system for deicing a turbine engine inlet cone, the design of which relies in general on a specific bleed of air from the middle or the outlet of the high-pressure compressor where the air is hot enough to be able subsequently to perform the function of deicing the cone. In this respect it is noted that this bleed cannot usually be made at the outlet of the low-pressure compressor because of the low amount of energy that air in this part of the turbine engine has.

The deicing system may have to incorporate elements specific to this bleed, such as ducts, one or more sealing systems, or alternatively valves for regulating the deicing airflow rate.

Naturally, these elements added specifically in order to be able to deice the inlet cone are extremely penalizing in terms of production costs and associated mass.

Furthermore, it is emphasized that the specific air bleed taken from the middle or the outlet of the high-pressure compressor has an appreciable detrimental effect on turbine engine overall performance.

SUMMARY OF THE INVENTION

It is therefore an object of the invention to propose an aircraft turbine engine inlet cone deicing system that overcomes the abovementioned problems relating to embodiments of the prior art.

To achieve this, one subject of the invention is a system for deicing an aircraft turbine engine inlet cone comprising air-diffusing means intended to equip the inlet cone of the turbine engine so as to deliver hot air thereto. According to the invention, it also comprises a circuit for removing pressurizing air from at least one bearing enclosure of the turbine engine, this circuit communicating with the air-diffusing means in order to be able to supply the latter with hot air.

Furthermore, another subject of the invention is an aircraft turbine engine comprising a deicing system like the one set out hereinabove.

In addition, another subject of the invention relates to a method of deicing an aircraft turbine engine inlet cone. In this method, in order to supply hot air to the air-diffusing means with which the turbine engine inlet cone is equipped, use is made of hot air from a circuit for removing pressurizing air from at least one bearing enclosure of the turbine engine.

Thus, the special feature of the present invention lies in the recirculation of the air used to pressurize the bearing enclosures of the turbine engine because this oil-free hot air leaving the bearing enclosures is now used to deice the inlet cone of this turbine engine. As a result, the heat energy originating from the dissipation of heat at the rolling bearings located inside the bearing enclosures is put to good use given that this heat energy is transferred directly to the air which can therefore achieve a level of energy that is easily enough to deice the inlet cone. This beneficial use of the heat energy thus contrasts with the lack of optimization encountered in embodiments of the prior art in which the oil-free air leaving the bearing enclosures was removed directly in the downstream direction by the turbine engine driveshafts system.

In addition, it now becomes possible to appreciably simplify the design of the turbine engine inasmuch as there is naturally no longer any need to keep the specific air bleed circuit encountered in the prior art and described hereinabove. Indeed, the air bleed intended for deicing the inlet cone is now the same as the one dedicated to pressurizing the bearing enclosures, making it possible to dispense with elements of the duct, sealing system or alternatively regulating valve type. This special feature advantageously makes it possible to achieve savings in terms of the cost of producing the turbine engine and its overall mass.

Furthermore, recirculating the air used to pressurize the bearing enclosures also results in a saving on fuel consumption and therefore results in a gain in turbine engine overall performance because there is no longer any need to bleed off any more air than is required for pressurizing the bearing enclosures. In this respect, it is noted that the recirculation performed in the present invention is all the more advantageous if the common air bleed can be taken from the outlet of the low-pressure compressor and therefore not necessarily from the middle or from the outlet of the high-pressure compressor where air bleeds prove to be far more penalizing.

The design adopted allows permanent deicing of the inlet cone, even outside of icing conditions, without that resulting in a drop in turbine engine output. The recirculated air does not therefore have to pass through a dedicated regulating valve before entering the air-diffusing means with which the inlet cone is intended to be equipped, which means that deicing reliability is advantageously enhanced.

As a preference, the circuit for removing pressurizing air from at least one bearing enclosure of the turbine engine comprises a main air duct at least partially situated within a system of driveshafts of the turbine engine, this main air duct being directed parallel to a longitudinal axis of this turbine engine, and preferably centered on this longitudinal axis. Provision may be made for this main air duct to consist at least partially of a duct conventionally attached within the driveshafts system, this duct being known as the "center vent" or alternatively a duct for deaerating the bearing enclosures. Nevertheless, this duct could equally consist fully or partially of a hollow portion of the driveshafts system and more particularly of the hollow portion of the innermost low-pressure shaft, which is generally used to house the aforementioned "center vent".

As a preference, the main air duct has an upstream end communicating with said air-diffusing means which are intended to equip the turbine engine inlet cone, and a downstream end that is blocked off, preferably located near a downstream end of the low-pressure driveshaft of the driveshafts system.

Again as a preference, in order to allow a satisfactory flow of hot air in the upstream direction within the main air duct, the latter has a cross section that is more or less circular and uniform along its length.

As a preference, the circuit for removing pressurizing air from at least one bearing enclosure of the turbine engine communicates with a front bearing enclosure and a rear bearing enclosure of the turbine engine. Naturally, it would be possible to anticipate for the circuit for removing the pressurizing air from at least one bearing enclosure to communicate with just one of the two aforementioned bearing enclosures, without departing from the scope of the invention.

The circuit for removing pressurizing air preferably comprises at least one oil-removal system equipping each of the front and rear bearing enclosures, each oil-removal system communicating with the main air duct of the removal circuit.

Finally, by way of illustrative example, the air-diffusing means comprise an air-carrying duct, a downstream end of which is connected to the circuit for removing pressurizing air and an upstream end of which lies in the region of a vertex of a secondary cone intended, together with the turbine engine inlet cone, to delimit a deicing space through which the hot air is intended to pass. However, it is emphasized that any type of air-diffusing means known to those skilled in the art and capable of being fitted to the inlet cone may be used for implementing the present invention.

Other advantages and characteristics of the invention will become apparent through the nonlimiting detailed description hereinbelow.

BRIEF DESCRIPTION OF THE DRAWINGS

This description will be given with reference to the attached drawings among which.

DETAILED DESCRIPTION OF THE PREFERRED EMBODIMENTS

Figure 1:
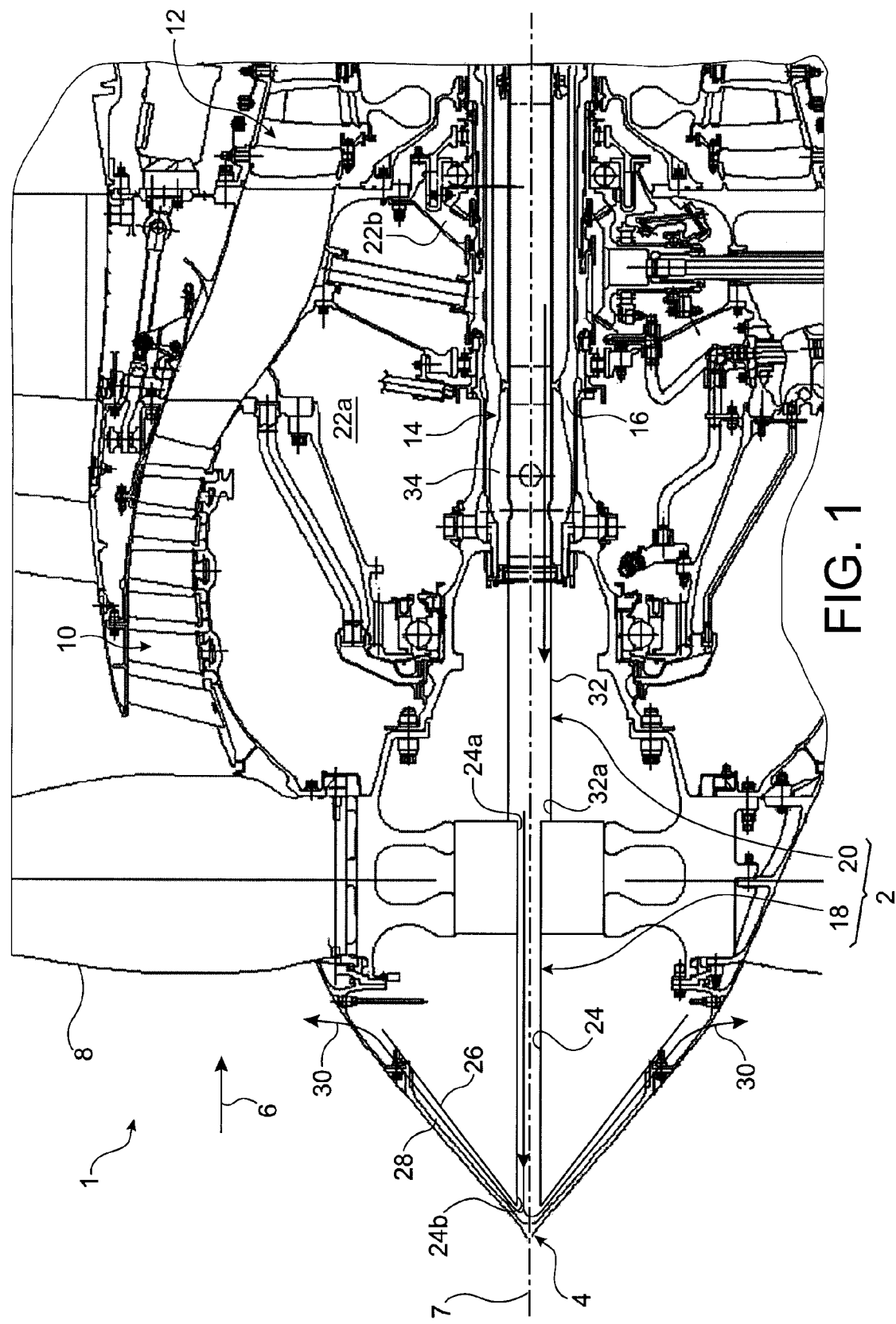
FIG. 1 depicts a view in longitudinal section of a front part of a turbine engine equipped with a system for deicing an inlet cone according to a preferred embodiment of the present invention.

Reference is made first of all to FIG. 1 which shows a front part of an aircraft turbine engine 1 equipped with an inlet cone deicing system 2 according to a preferred embodiment of the present invention. In this respect it is noted that the turbine engine 1, of the turbojet engine type, is itself a subject of the present invention.

Overall, the front part of this turbine engine 1 comprises, from upstream to downstream in the general direction in which air flows through the turbine engine, as depicted diagrammatically by the arrow 6 and parallel to a longitudinal axis 7 of this turbine engine, the inlet cone 4, a fan 8, a low-pressure compressor 10 and a high-pressure compressor 12.

Furthermore, still in a way known to those skilled in the art, the turbine engine comprises a driveshafts system 14 comprising a number of concentric shafts centered on the axis 7 and the prime function of which is to allow the rotary elements of the turbine engine to rotate. In this respect, the driveshafts system 14 conventionally comprises a low-pressure driveshaft 16 connecting the low-pressure compressor 10 and the low-pressure turbine (not visible in FIG. 1) of the turbine engine. This low-pressure driveshaft 16 stretches more or less from one end of the turbine engine to the other, and generally constitutes the innermost shaft of the system of shafts 14. In addition, it is generally hollow making it possible, according to one specific feature of the present invention, for part of the deicing system 2 to be housed within it as will be described hereinafter.

Specifically, the system 2 for deicing the cone 4 on the whole comprises air-diffusing means 18 intended to equip the inlet cone 4 so as to deliver hot air to it, and a circuit 20 for removing pressurizing air from at least one bearing enclosure of the turbine engine, this circuit 20 being situated downstream of the means 18 with which it communicates, as is clearly visible in FIG. 1.

In the example shown in this same figure, the air-diffusing means 18 comprise an air-carrying duct 24 centered on the axis 7 and a downstream end 24a of which is connected to the circuit 20 for removing the pressurizing air and an upstream end 24b of which lies in the region of a vertex of a secondary cone 26 situated downstream of and internally with respect to the cone 4. The secondary cone 26 is intended, together with the cone 4, to delimit a deicing space 28 through which the hot air is intended to pass. Thus, the hot air leaving the duct 24 via the upstream end 24b moves downstream and radially outward in the substantially conical deicing space 28 provided for this purpose, before being removed from the turbine engine through orifices positioned near a downstream end of the cone 4, as shown schematically by the arrows 30 in FIG. 1.

The circuit 20 for removing pressurizing air from at least one bearing enclosure of the turbine engine itself comprises a main air duct 32 situated within the driveshafts system 14. This main air duct 32 is centered on the longitudinal axis 7 and has an upstream end 32a connected to the downstream end 24a of the duct 24 belonging to the air-diffusing means 18.

The main air duct 32, which preferably has a cross section that is more or less circular and uniform along its entire length, preferably stretches as far as a downstream end (not visible in FIG. 1) of the low-pressure shaft 16. In addition, it is anticipated for it to consist, to a large extent, of a duct known as the "center vent" attached fixedly within the longitudinal hollow 34 formed in the low-pressure shaft 16 and the uniformity of the circular cross section of which allows the air using this duct to flow undisturbed in the upstream direction. As is most clearly visible in FIG. 3, it is noted that only a small rear portion of the main air duct 32 consists of the hollow part 34 of the shaft 16 situated in the rearward extension of the "center vent" duct, the latter effectively having a downstream end 35 situated upstream of a plug 36 that blocks off the downstream end 32b of the duct 32. Furthermore, it is noted that the plug 36 is positioned near the downstream end 16b of the low-pressure shaft 16 so that in this instance it is possible to consider that the two ends 16b, 32b are very close together, if not substantially coincident.

Figure 2:
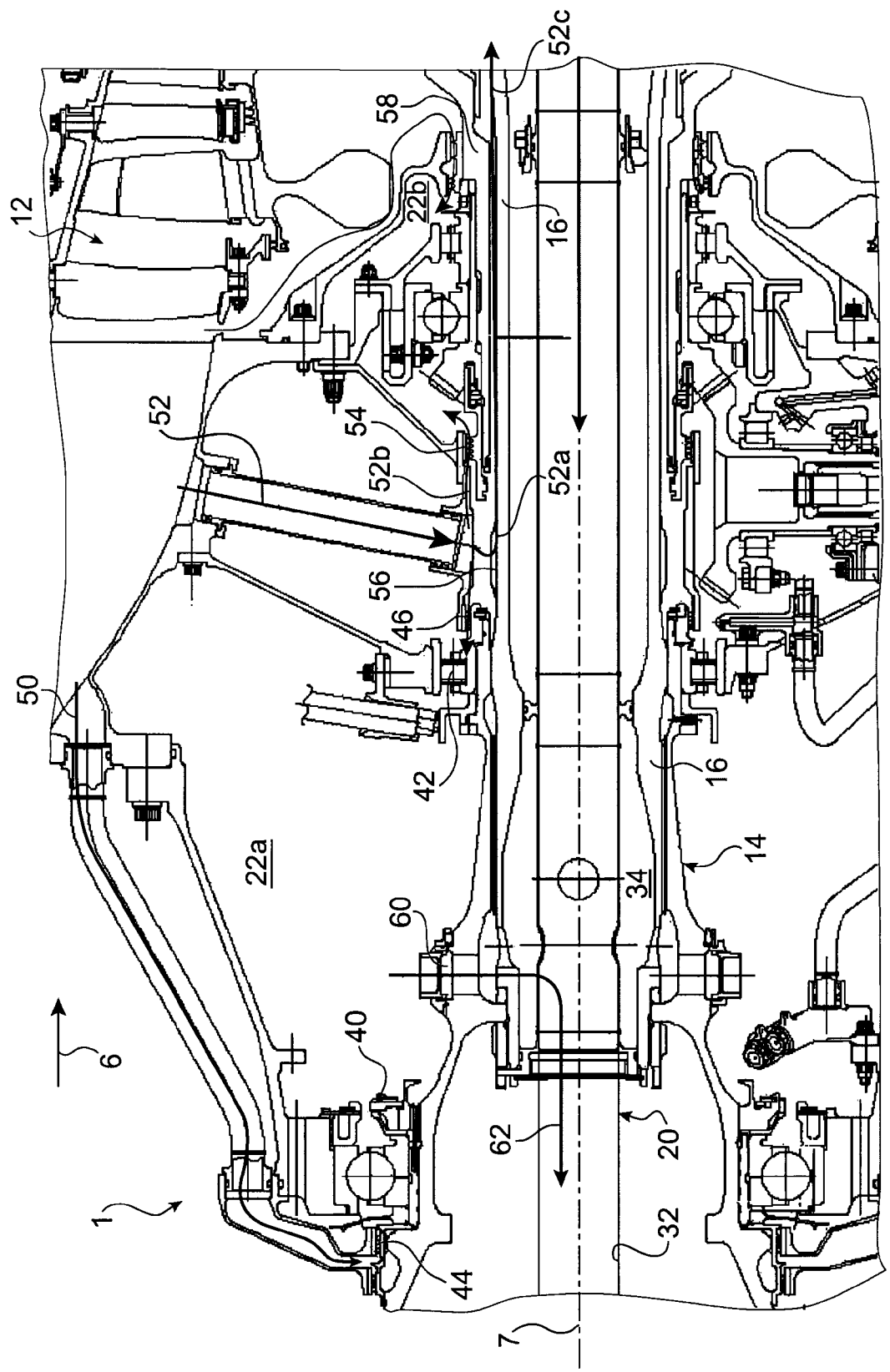
FIG. 2 depicts a detailed view of part of the view shown in FIG. 1.

Reference is now made to FIG. 2 which details the front part of the turbine engine 1 and shows two front bearing enclosures 22a, 22b of the turbine engine, centered on the axis 7 and offset from one another in the direction 6. In a way known to those skilled in the art, each bearing enclosure of a turbine engine contains at least one shaft rolling bearing system and is closed off by a plurality of air/oil sealing systems of the labyrinth seal or similar type.

Thus, the most upstream front bearing enclosure 22a incorporates two shaft rolling bearing systems 40, 42 situated one of them near an upstream sealing system 44 and the other near a downstream sealing system 46 that closes off this enclosure. It is anticipated that a flow of air be forced to enter the inside of the enclosure 22a at each of the latter two systems 44, 46 so as to prevent the oil present within this enclosure 22a from escaping through these same air/oil sealing systems 44, 46. By way of indication, the air brought to these systems 44, 46 is usually known as the air for pressurizing the front bearing enclosure 22a, and is conveyed as far as the sealing systems by conventional ducts known to those skilled in the art.

To convey enclosure pressurizing air to the upstream sealing system 44 of the bearing enclosure 22a, a first air bleed depicted schematically by the arrow 50 is taken, this bleed preferably being taken at an outlet of the low-pressure compressor 10. Furthermore, to convey enclosure pressurizing air to the downstream sealing system 46 of the bearing enclosure 22a, a second air bleed depicted schematically by the arrow 52 is taken, some 52a of this bleed being directed toward the labyrinth 46 as is clearly visible in FIG. 2. Here again, the bleed 52 is preferably taken at an outlet of the low-pressure compressor 10.

In this respect, it is noted that another part 52b of the second bleed 52 is directed toward an upstream labyrinth 54 of the most downstream front bearing enclosure 22b, which will not be described further here.

Figure 3:
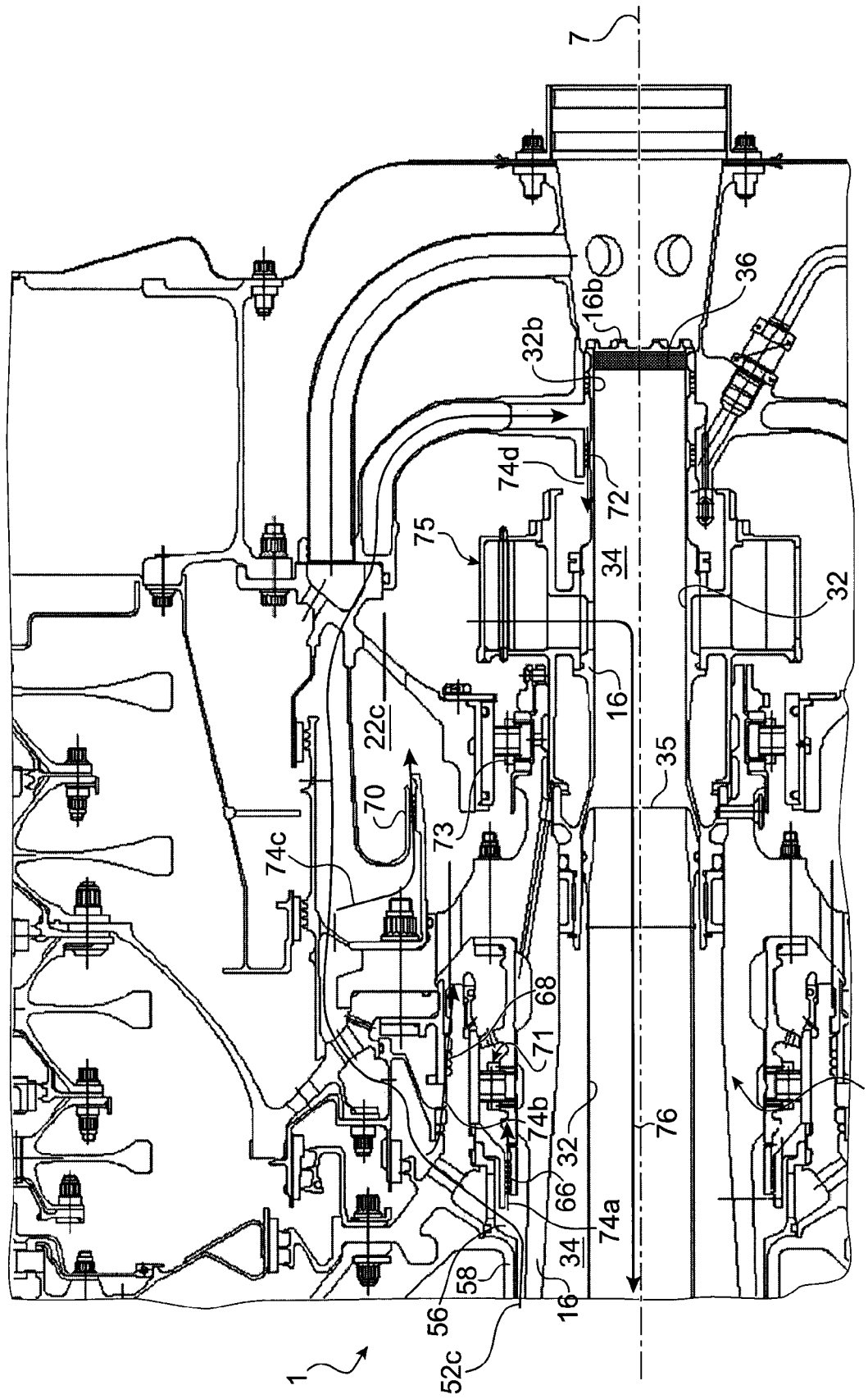
FIG. 3 depicts a detailed partial view in longitudinal section of a rear part of the turbine engine shown in FIG. 1.

Finally, yet another part 52c of the second bleed 52 is directed toward the rear bearing enclosure 22c shown in FIG. 3. To do this, this part 52c of the second bleed 52 is directed in the downstream direction into an annular space 56 situated between the low-pressure shaft 16 and the high-pressure shaft 58 surrounding it.

Still with reference to FIG. 2, it is possible to notice that the circuit 20 for removing pressurizing air, forming an integral part of the deicing system 2, comprises an oil-removal system 60 with which an internal radial part of the annular enclosure 22a is equipped. The air/oil mixture lying inside this enclosure 22a and warmed by the heat given off by the rolling bearings 40, 42 is therefore removed radially inward by the oil-removal system 60, the purpose of which is to filter the oil from the mixture in order to end up with a stream of recirculated hot air 62 capable of being fed to the air-diffusing means 18 with which the inlet cone 4 is equipped. Indeed, the stream of recirculated hot air 62 obtained at the outlet of the oil-removal system 60 and originating from the air bleeds 50, 52 moves through the duct 32 toward the only open end 32a thereof, to reach the air-diffusing means 18 with which the inlet cone 4 is equipped.

Reference is now made to FIG. 3 which depicts a rear part of the turbine engine 1 and shows that the rear bearing enclosure 22c incorporates two shaft rolling bearing systems 71, 73 and that this enclosure 22c is closed off by a plurality of upstream sealing systems 66, 68, 70 and by a downstream sealing system 72. Here again, it is anticipated that a flow of air be forced to enter the inside of the enclosure 22c at each of these air-oil sealing systems so as to prevent the oil present within this enclosure 22c from escaping through these same sealing systems.

In order to carry enclosure pressurizing air to each of the sealing systems 66, 68, 70, 72 of the bearing enclosure 22c, use is made of the part 52c of the second air bleed 52 that is passing in the downstream direction through the annular space 56 located between the shafts 16 and 58. Thus, the part 52c of the bleed 52 is split into four pressurizing-air streams 74a, 74b, 74c, 74d each entering the enclosure 22c via the air/oil sealing systems 66, 68, 70, 72, respectively.

Still with reference to FIG. 3, it can be seen that the circuit 20 for removing pressurizing air also comprises an oil-removal system 75 with which an internal radial part of the annular enclosure 22c is equipped. The air/oil mixture lying within this enclosure 22c and warmed by the heat given off by the rolling bearings 71, 73 is therefore removed radially inward by the oil-removal system 75, the purpose of which is to filter the oil from the mixture so as to end up with a stream of recirculated hot air 76 capable of joining the recirculated stream 62 to supply the air-diffusing means 18 with which the inlet cone 4 is equipped.

Specifically, the stream of recirculated hot air 76 obtained on the outlet side of the oil-removal system 75 and originating from the air bleed 52 passes through the duct 32 toward the only open end 32a thereof to reach the air-diffusing means 18 with which the inlet cone 4 is equipped. By way of indication, it is noted that this stream of recirculated hot air 76 opens into the duct 32 in the rear part thereof which is defined by the hollow 34 of the low-pressure shaft 16, so that it does not reach the "center vent" duct until after it has traveled a certain distance in the upstream direction along the main air duct 32.

Of course, the person skilled in the art can make various modifications to the turbine engine 1 which has just been described solely by way of nonlimiting example.

The invention claimed is:

1. A deicing system for an aircraft turbine engine inlet cone, comprising:
   an air bleed configured to supply pressurizing air from an airflow to at least one of bearing enclosure, and the air bleed configured to remove the pressurizing air from the airflow at one or more bleed points downstream of fan blades of the engine and upstream from a high-pressure compressor of the engine;
   the at least one bearing enclosure, each of the at least one bearing enclosure including
      at least one downstream sealing system configured to seal the bearing enclosure from a remainder of the turbine engine and to allow the pressurizing air to enter the bearing enclosure,
      at least one shaft rolling bearing system, and
      a lubricant configured to lubricate the at least one shaft roller bearing system;
   a circuit configured to supply the pressurizing air from the at least one bearing enclosure to an air diffusing means, the circuit including
      an oil removal system disposed within the at least one of the plurality of bearing enclosures, the oil removal system configured to allow the air bleed to exit from the bearing enclosure, the oil removal system configured to prevent the lubricant from exiting the bearing enclosure; and
   the air-diffusing means configured to supply the pressurizing air from the circuit to a deicing space, the deicing space configured to receive the pressurized air from the air-diffusing means near a location on an inner surface of the inlet cone disposed on a longitudinal axis of the turbine engine, the deicing space configured to allow the pressurized air to flow along the inner surface of the inlet cone and an outer surface of a secondary cone disposed downstream and enclosed by the inlet cone, and the deicing space configured to allow the pressurized air to flow out of the engine through a wall of the inlet cone at orifices disposed near a downstream end of the inlet cone to convectively heat an outside surface of the inlet cone.

2. The deicing system as claimed in claim 1, wherein said circuit for removing the pressurizing air from the at least one bearing enclosure of the turbine engine comprises
   a main air duct at least partially disposed within a system of shafts of the turbine engine, the system of shafts configured to deliver power from a first turbine component to the fan and from a second turbine component to the high-pressure compressor, and said main air duct being directed parallel to the longitudinal axis of the turbine engine.

3. The deicing system as claimed in claim 2, wherein said main air duct is centered on the longitudinal axis of the turbine engine.

4. The deicing system as claimed in claim 2, wherein said main air duct has an upstream end communicating with said air-diffusing means configured to supply the pressurized air to the inlet cone, and a downstream end of the main air duct configured to be blocked off to the pressurized air.

5. The deicing system as claimed in claim 2, wherein said main air duct has a cross section that is substantially circular and uniform along the longitudinal axis of the turbine engine.

6. The deicing system as claimed in claim 2, wherein said circuit for removing the pressurizing air from the at least one bearing enclosure of the turbine engine communicates with at least one front bearing enclosure and at least one rear bearing enclosure of the turbine engine, wherein the front bearing enclosure includes one of the at least one shaft rolling bearing system connected to an upstream end of a shaft included in the system of shafts, and wherein the rear bearing enclosure includes another of the at least one shaft rolling bearing system connected to a downstream end of a shaft included in the system of shafts.

7. The deicing system as claimed in claim 6, wherein said circuit for removing said pressurizing air comprises at least one oil-removal system for each of said front bearing enclosure and each of said rear bearing enclosure, each of the at least one oil-removal system communicating with said main air duct of the circuit.

8. The deicing system as claimed in claim 6,
wherein said pressurized air is supplied to at least one front bearing enclosure and at least one rear bearing enclosure,
wherein the at least one rear bearing enclosure is supplied with the pressurized air through a single airflow traveling through an annular space surrounded by the high-pressure compressor, and
wherein the at least one rear bearing enclosure is in communication with said main air duct of the circuit through the oil removal system and the at least one rear bearing enclosure is free from communication with the at least one front bearing enclosure.

9. The deicing system as claimed in claim 8, wherein the annular space is disposed between two shafts included in the system of shafts.

10. The deicing system as claimed in claim 8, wherein the turbine engine has only a single rear bearing enclosure, wherein the single airflow is split into four pressurizing airflows at a location to a rear of a turbine disk, wherein each of the four pressurizing airflows enters the single rear bearing enclosure through four sealing systems.

11. The deicing system as claimed in claim 1, wherein said air-diffusing means, comprise:
an air-carrying duct having a downstream end connected to the circuit for removing the pressurizing air and an upstream end disposed in a region of a vertex of the secondary cone and a vertex of said turbine engine inlet cone, and the region configured to delimit a deicing space through which the hot air is intended to pass.

12. An aircraft turbine engine having a deicing system, the deicing system comprising:
an air bleed configured to supply pressurizing air from an airflow to at least one of bearing enclosure, and the air bleed configured to remove the pressurizing air from the airflow at one or more bleed points downstream of fan blades of the engine and upstream from a high-pressure compressor of the engine;
the at least one bearing enclosure, each of the at least one bearing enclosure including
at least one downstream sealing system configured to seal the bearing enclosure from a remainder of the turbine engine and to allow the pressurizing air to enter the bearing enclosure,
at least one shaft rolling bearing system, and
a lubricant configured to lubricate the at least one shaft roller bearing system;
a circuit configured to supply the pressurizing air from the at least one bearing enclosure to an air diffusing means, the circuit including
an oil removal system disposed within the at least one of the plurality of bearing enclosures, the oil removal system configured to allow the air bleed to exit from the bearing enclosure, the oil removal system configured to prevent the lubricant from exiting the bearing enclosure; and
the air-diffusing means configured to supply the pressurizing air from the circuit to a deicing space, the deicing space configured to receive the pressurized air from the air-diffusing means near a location on an inner surface of the inlet cone disposed on a longitudinal axis of the turbine engine, the deicing space configured to allow the pressurized air to flow along the inner surface of the inlet cone and an outer surface of a secondary cone disposed downstream and enclosed by the inlet cone, and the deicing space configured to allow the pressurized air to flow out of the engine through a wall of the inlet cone at orifices disposed near a downstream end of the inlet cone to convectively heat an outside surface of the inlet cone.

13. A method of deicing an aircraft turbine engine inlet cone, comprising:
bleeding pressurized air from an airflow at one or more bleed points downstream of fan blades of the engine and upstream from a high-pressure compressor of the engine;
guiding the pressurized air to a location near a rear bearing enclosure through a single annular space disposed between two shafts, the two shafts configured to deliver power from a first turbine to a first compressor and a second turbine to a fan;
splitting the pressurized air into four streams to enable each of the four streams to enter the rear bearing enclosure through different downstream sealing systems;
mixing the four streams and lubricant within the rear bearing enclosure to create an air-lubricant mixture;
transferring heat from roller bearings disposed within the rear bearing enclosure to the air-lubricant mixture, the roller bearings connected to two ends of the two shafts, the two ends are connected to the first turbine and the second turbine;
separating a hot airflow from the air-lubricant mixture at an oil removal system disposed within the rear bearing enclosure, the hot airflow including the four streams;
transferring the hot airflow from the rear bearing enclosure to a deicing space within an inlet cone through a main air duct within one of the two shafts, the deicing space is bounded by an internal wall of the inlet cone and an external surface of a secondary cone disposed downstream of the inlet cone and enclosed by the inlet cone;
transferring heat convectively from the hot airflow to the inner surface of the inlet cone disposed at an axis of rotation of the two shafts,
transferring heat convectively from the hot air to downstream sections of the inner surface of the inlet cone as the hot air moves to orifices disposed near a downstream end of the inlet cone; and
allowing the hot air to exit the inlet cone through the orifices to heat an external surface of the inlet cone.

* * * * *